United States Patent [19]

Godfrey

[11] 4,397,336

[45] Aug. 9, 1983

[54] CONTROL DEVICE FOR HYDRAULIC SPOOL VALVES

[76] Inventor: Philip D. Godfrey, 47 Dudley Rd., Grantham, Lincolnshire, England

[21] Appl. No.: 227,211

[22] Filed: Jan. 22, 1981

[30] Foreign Application Priority Data

Jan. 24, 1980 [GB] United Kingdom ................ 8002438

[51] Int. Cl.³ ........................................... F16K 31/44
[52] U.S. Cl. ............................ 137/636.2; 74/471 R; 74/471 XY; 74/473 R; 251/231
[58] Field of Search .............. 137/636.2, 636.3, 636.1, 137/636; 74/471 XY, 471 R, 473 R, 18.1; 251/231

[56] References Cited

U.S. PATENT DOCUMENTS

| 2,403,519 | 7/1946 | Gardiner | 137/636 |
| 2,700,904 | 2/1955 | Woods | 74/471 XY |
| 2,705,971 | 4/1955 | Dorkins | 137/636.2 |
| 3,496,796 | 2/1970 | Alpers et al. | 74/471 XY |
| 3,550,467 | 12/1970 | Forichon | 74/473 R |

FOREIGN PATENT DOCUMENTS 1804035 4/1970 Fed. Rep. of Germany .... 74/471 R

*Primary Examiner*—George L. Walton
*Attorney, Agent, or Firm*—Auslander & Thomas

[57] ABSTRACT

There is described a control device for actuating a pair of hydraulic spool valves arranged, for example, side-by-side in a valve block. The device includes a two-arm actuating member such that when the actuating member is pivotted about the axis of one of the arms the other arm operates its associated valve and vice versa, the valves being operatively connected to its respective arm through a follower.

5 Claims, 5 Drawing Figures

CONTROL DEVICE FOR HYDRAULIC SPOOL VALVES

This invention relates to a control device for hydraulic spool valves.

In hydraulic systems it is often required to operate two valve spools using a single control lever. Hitherto, arrangements which permit such operation have been complicated and have necessitated remote linkages.

Also, in such prior art arrangements, the direction of movement of the control lever was not directly related to the resultant movement of the controlled hydraulic device. Such actuators, known as X-axis actuators, gave rise to operational difficulties.

It is an object of the present invention to provide an improved control device for hydraulic spool valves which operates on a "plus-axis" and obviates or mitigates the disadvantages of the hitherto proposed systems.

According to the present invention there is provided a control device for hydraulic spool valves comprising a control lever mounted on a spherical pivot, an actuating member fixed to said lever in the plane of said pivot and having a first arm extending along a second axis in said plane and having a second arm extending along a second axis in said plane at right-angles to said first axis, said first arm being connectible to a first spool valve to operate the first spool valve when the control lever is pivotted about said second axis and said second arm being connectible to a second spool valve to operate the second spool valve when the control lever is pivotted about said first axis.

Preferably, said arms are close coupled to said spool valves, through ball joints.

An embodiment of the present invention will now be described, by way of example, with reference to the accompanying drawings, in which.

Figure 1:
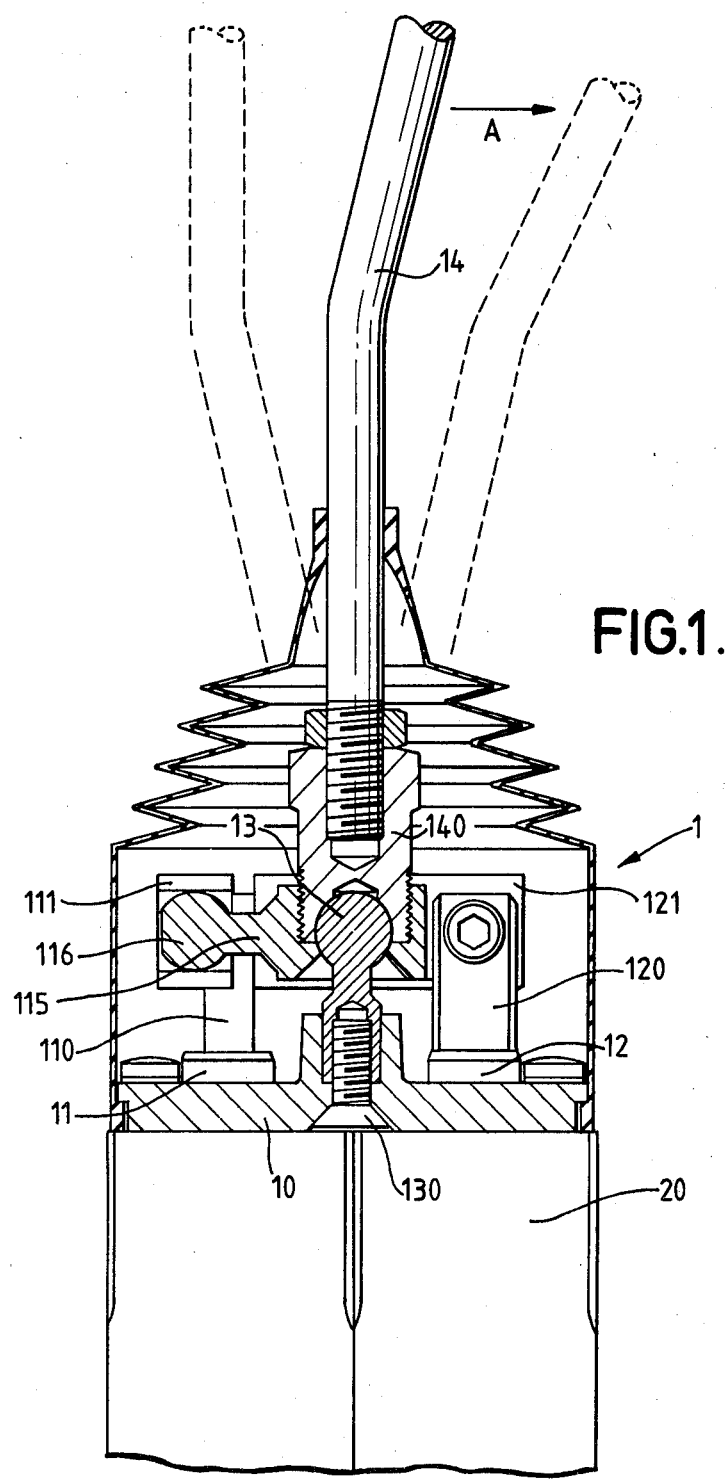
FIG. 1 is a front elevational view, in section, of a control device made in accordance with the present invention.
Figure 2:
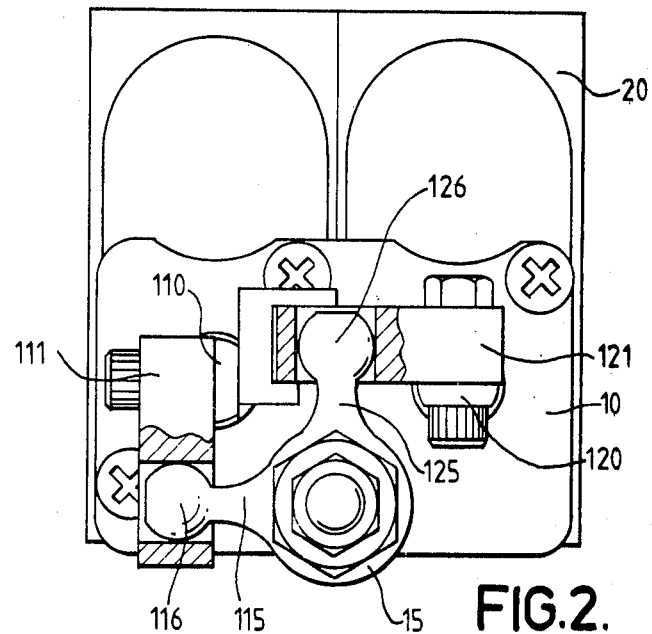
FIG. 2 is a top plan view, in part section, of the device of FIG. 1.
Figure 3:
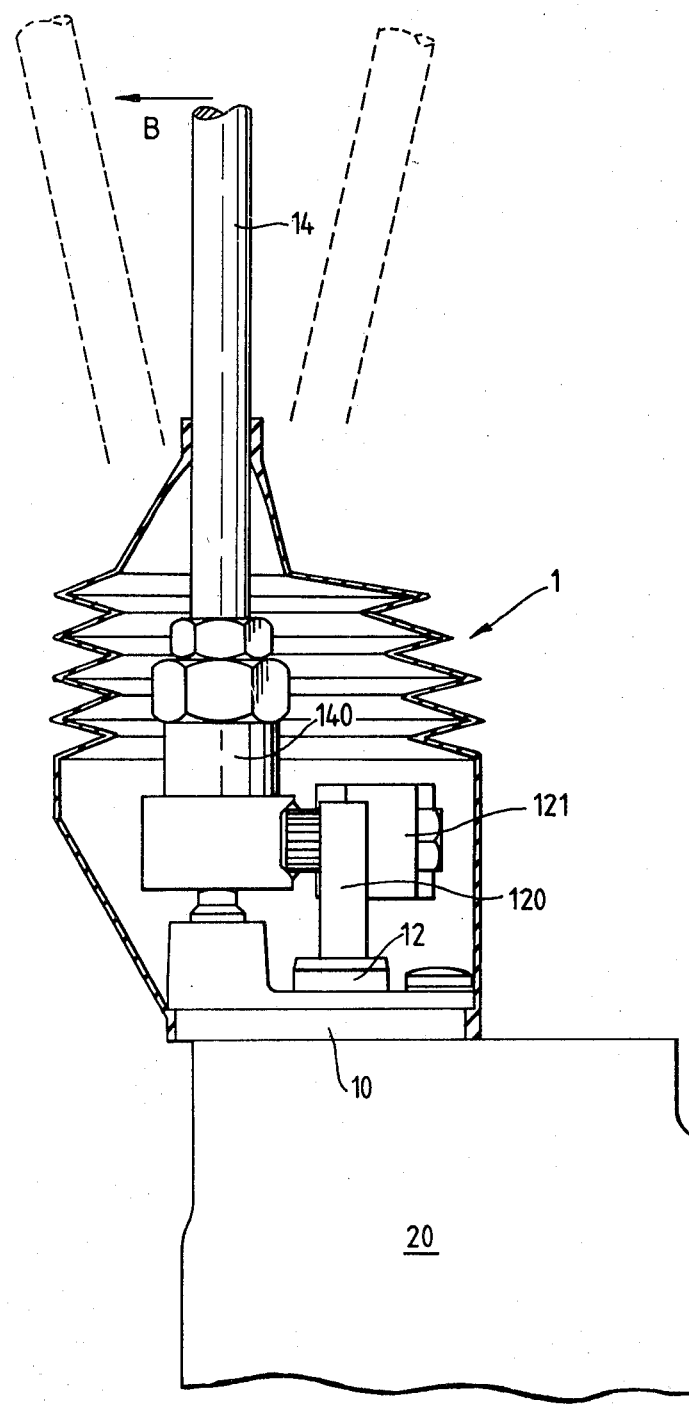
FIG. 3 is a side elevational view of the device of FIG. 1.

Referring to FIGS. 1 to 3 of the drawings, a control device 1 for hydraulic spool valves comprises a support plate 10 mountable on a suitable support such as a valve block 20 in which there are mounted first and second spool valves 11 and 12 respectively. The spools 11 and 12 extend through the support plate 10. Each spool has a flattened end portion 110 and 120 to which there are fixedly connected respective followers 111 and 121. The followers 111 and 121 extend at right-angles to each other in a plane parallel to the support plate 10 and therefore at right-angles to the axes of the spool valves. The spools operate in a conventional manner by moving along their respective axes.

A spherical pivot 13 is fixed on the support plate 10 by means of a set screw 130 such that the centre of the spherical pivot 13 is equidistant from the followers 111 and 121 and lies in the same plane as the centres of the followers when the spools are in the neutral position.

A control lever 14 is pivotally mounted on the spherical pivot 13 by means of a boss 140 and carries a valve actuating member 15 which, in the neutral position, lies in the same plane as the followers 111 and 121 and the centre of the pivot 13.

The actuating member 15 has a first arm 115 which terminates in a ball joint 116 which engages the follower 111 and a second arm 125 which terminates in a ball joint 126 which engages the follower 121.

When the lever 14 is caused to pivot on the spherical pivot 13 in the direction of arrow A (FIG. 1) about the axis of the second arm 125, the first arm 115 pivots upwardly lifting the follower 111 and consequently causing the spool 11 to move upwardly. As the second arm 125 has not moved laterally but merely pivotted about its own axis, the follower 121 does not move and the spool 12 remains stationary. Clearly, when the lever is moved in a direction opposite to arrow A the spool 11 is moved downwardly.

Similarly, when the lever 14 is caused to pivot in the direction of arrow B (FIG. 3) on the spherical pivot 15 about the axis of the first arm 115, the second arm 125 pivots upwardly lifting the follower 121 and consequently causing the spool 12 to move upwardly. As the first arm 115 has not moved laterally but merely pivotted about its own axis, the follower 111 does not move and the spool 11 remains stationary. Clearly, when the lever is moved in a direction opposite to arrow B, the spool 12 is moved downwardly.

When the lever 14 is caused to pivot about an axis other than the axes of arms 115 and 125, both arms move translationally and thus both spools are operated.

Figure 4:
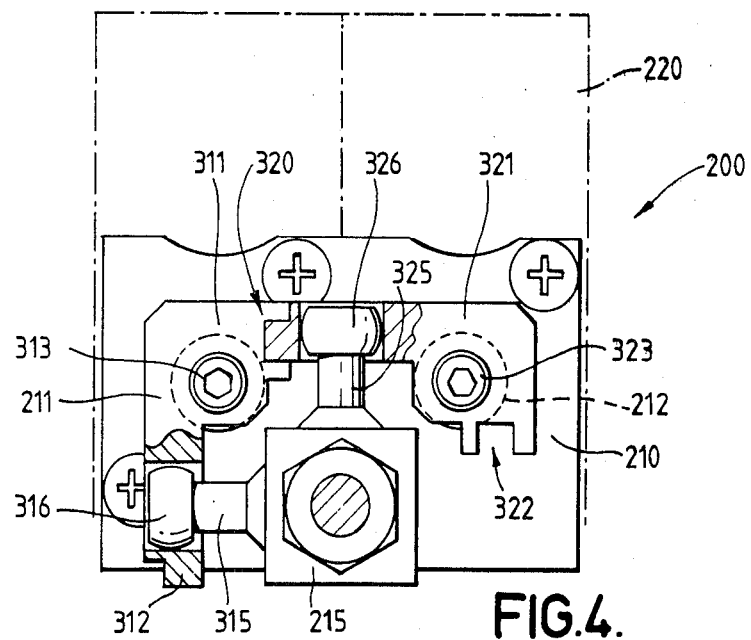
FIGS. 4 and 5 are views corresponding to FIGS. 2 3 respectively of a modified control device.
Figure 5:
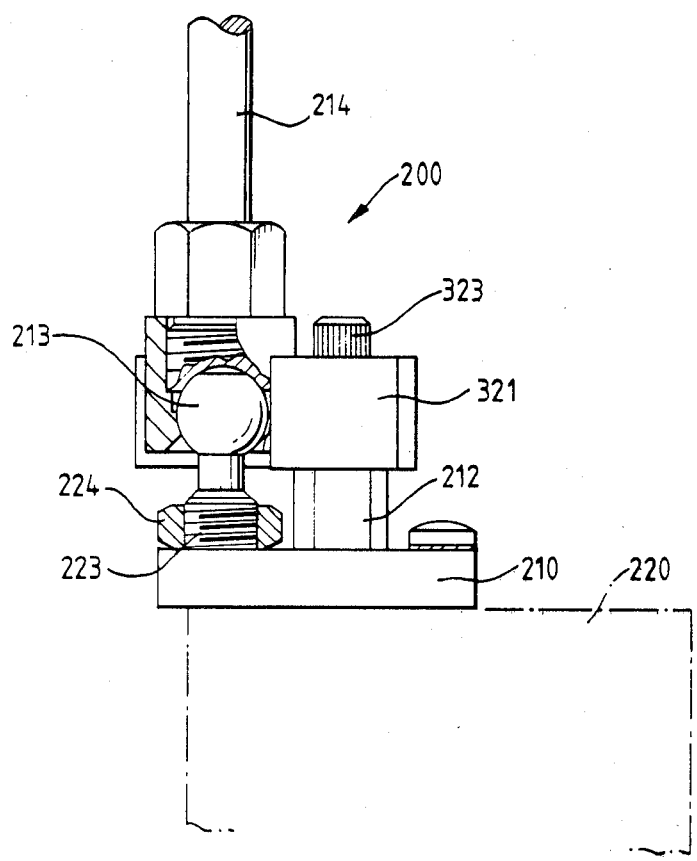

Referring now to FIGS. 4 and 5 of the drawings, a control device 201 is mounted on a support plate 210 mountable on a valve block 220 having a pair of side-by-side spool valves 211 and 212. Each of the spool valves 211 and 212 is provided with a respective one of a pair of identical substantially L-shaped followers 311 and 321. The followers are fixed to the free ends of the valves by set screws 313 and 323 and each follower has, at one end, a projection (such as 312) and at the other end a recess (such as 322) which mutually co-operates as illustrated at 320.

A spherical pivot 213 having a threaded shank 223 is mounted as the support plate 220 and is fixed by a locking nut 224. The spherical pivot 213 carries a control lever 214 fixed to a valve actuating member 215 having a pair of mutually orthogonal arms 315 and 325 which terminate in respective ball joints 316 and 326. The ball joints 316 and 326 engage respective followers 311 and 321. With respect to the embodiment of FIGS. 1 to 3, the actuating member 315 differs from the actuating member 15 in that the ball joints are cut away and the arms are of smaller diameter thus permitting greater pivotal movement of the arms with respect to the followers.

The device of FIGS. 4 and 5 operates in a manner similar to the device of FIGS. 1 to 3.

Thus the device of the present invention permits two spool valves, located in the same plane in a valve block, to be operated independently or simultaneously by a single lever without necessitating complicated linkages. The arrangement which permits close coupling of the spool to the control device results in more accurate control of the spools. Notwithstanding this, in situations where, due to lack of space, close coupling is not possible, the device of the present invention may be connected to the respective valve by means of flexible or non-flexible linkage.

Modifications and improvements may be incorporated without departing from the scope of the invention. For example, microswitches may be fitted to the device to indicate the condition of the respective valves.

What I claim is:

1. A control device for hydraulic spool valves comprising a control lever mounted on a spherical pivot, an actuating member fixed to said lever and lying in a plane and passing through the center of the spherical pivot of said pivot, and said actuating lever having a first arm extending along a first axis in said plane and having a second arm extending along a second axis in said plane at right-angles to said first axis, said first and second arms surrounding the spherical pivot and at least a portion of said control lever first and second elongate followers for connecting said first and second arms to respective first and second spool valves, one end of said first follower being mounted at the free end of said first arm and extending in said plane in a direction parallel to said second arm, the other end of said first follower being connectible to the first spool valve to operate the first spool valve when the control lever is pivotted about said second axis, one end of said second follower being mounted at the free end of said second arm and extending in said plane in a direction parallel to said first arm, the other end of said second follower being connectible to the second spool valve to operate the second spool valve when the control lever is pivotted about said first axis.

2. A control device as claimed in claim 1, wherein said first and second arms are connected to their respective followers through ball joints.

3. A control device as claimed in claim 2, wherein the followers are fixable to flattened end portions of the spool valves.

4. A control device as claimed in claim 1, wherein each follower is in the form of a substantially L-shaped member, one arm of said L-shaped member being adapted to receive the ball joint of a respective arm of the actuating member and the other arm of said L-shaped member being provided with a projection arranged to co-operate with a recess provided in the other arm of the other follower.

5. A control device for hydraulic spool valves comprising a control lever mounted on a spherical pivot, an actuating member fixed to said lever and lying in a plane and passing through the center of the spherical pivot, of said pivot, said actuating lever having a first arm extending along a first axis in said plane and having a second arm extending along a second axis in said plane at right-angles to said first axis, said first and second arms surrounding the spherical pivot and at least a portion of said control lever first and second elongate followers for connecting said first and second arms to respective first and second spool valves, one end of said first follower being mounted at the free end of said first end and extending in said plane in a direction parallel to said second arm, the other end of said first follower being connectible to the first spool valve to operate the first spool valve when the control lever is pivotted about said second axis, one end of said second follower being mounted at the free end of said second arm and extending in said plane in a direction parallel to said first arm, the other end of said second follower being connectible to the second spool valve to operate the second spool valve when the control lever is pivotted about said first axis, wherein each follower is in the form of a substantially L-shaped member, one arm of said L-shaped member being adapted to receive the ball joint of a respective arm of the actuating member and the other arm of said L-shaped member being provided with a projection arranged to co-operate with a recess provided in the other arm of the other follower.

* * * * *